(No Model.) 4 Sheets—Sheet 1.
R. D. HUME.
CAN HEADING AND SOLDERING MACHINE.
No. 576,122. Patented Feb. 2, 1897.
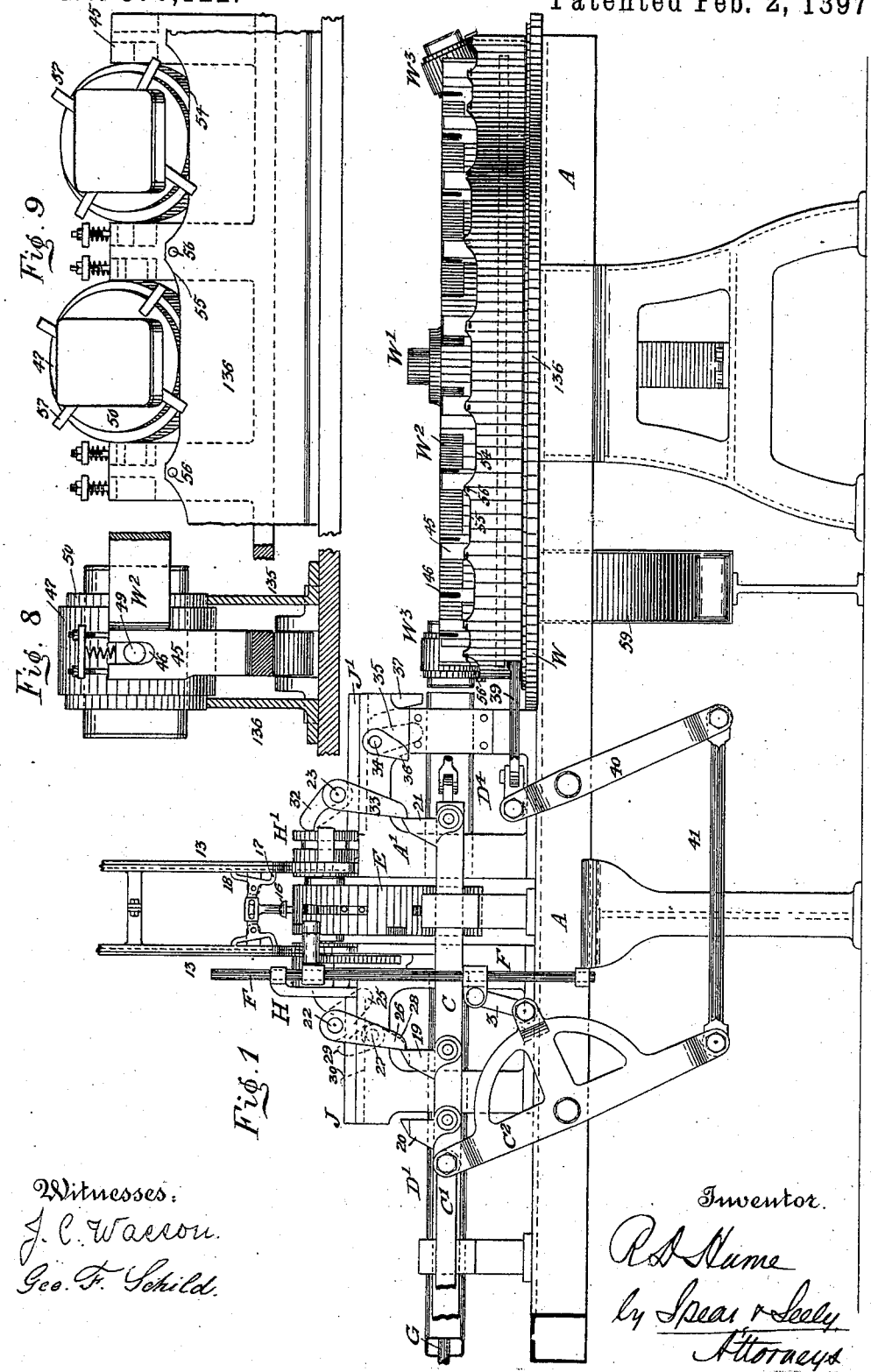
Witnesses:
J. C. Wasson.
Geo. F. Schild.
Inventor.
R. D. Hume
by Spear & Seely
Attorneys

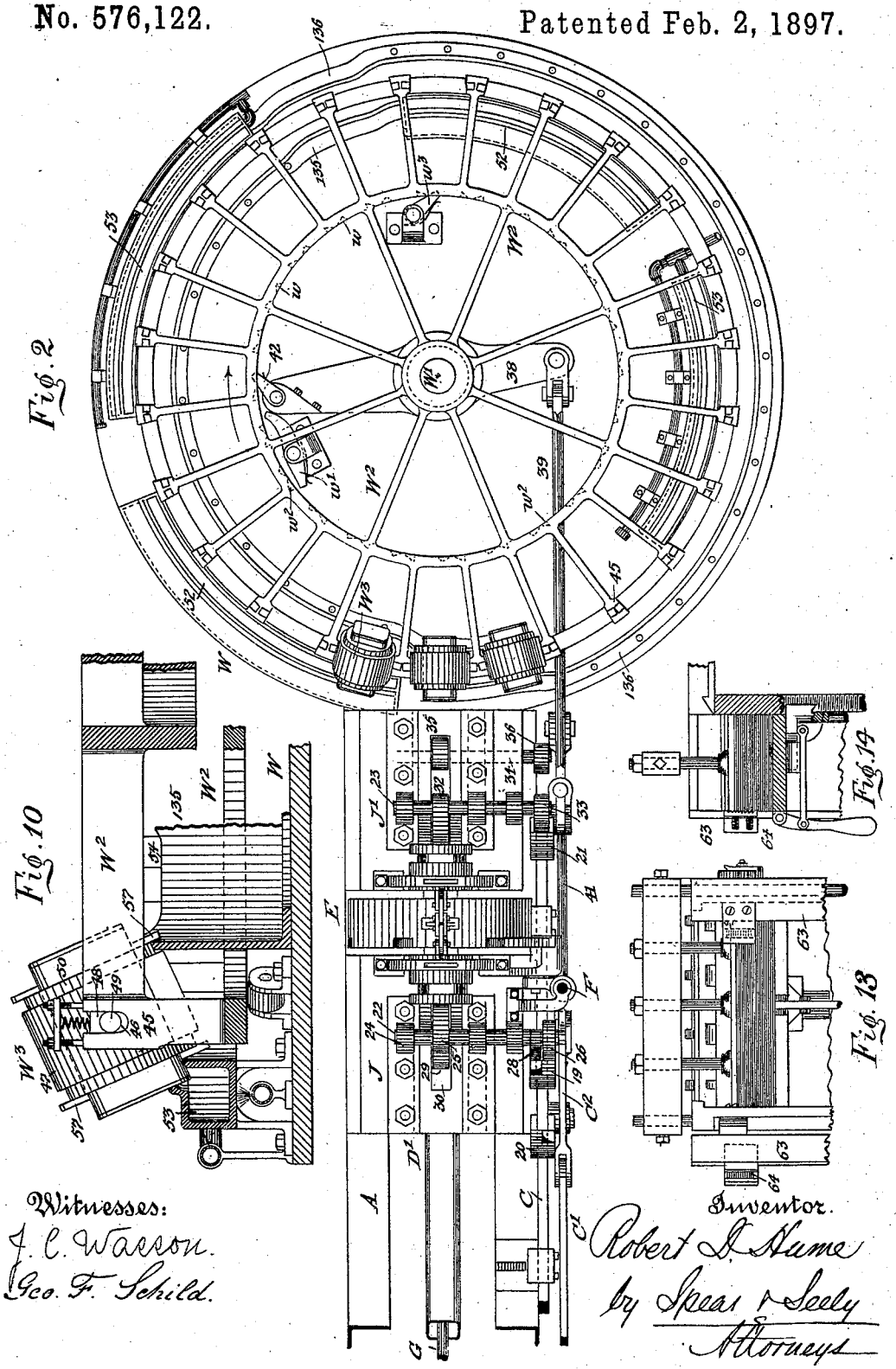

(No Model.) 4 Sheets—Sheet 3.
R. D. HUME.
CAN HEADING AND SOLDERING MACHINE.
No. 576,122. Patented Feb. 2, 1897.
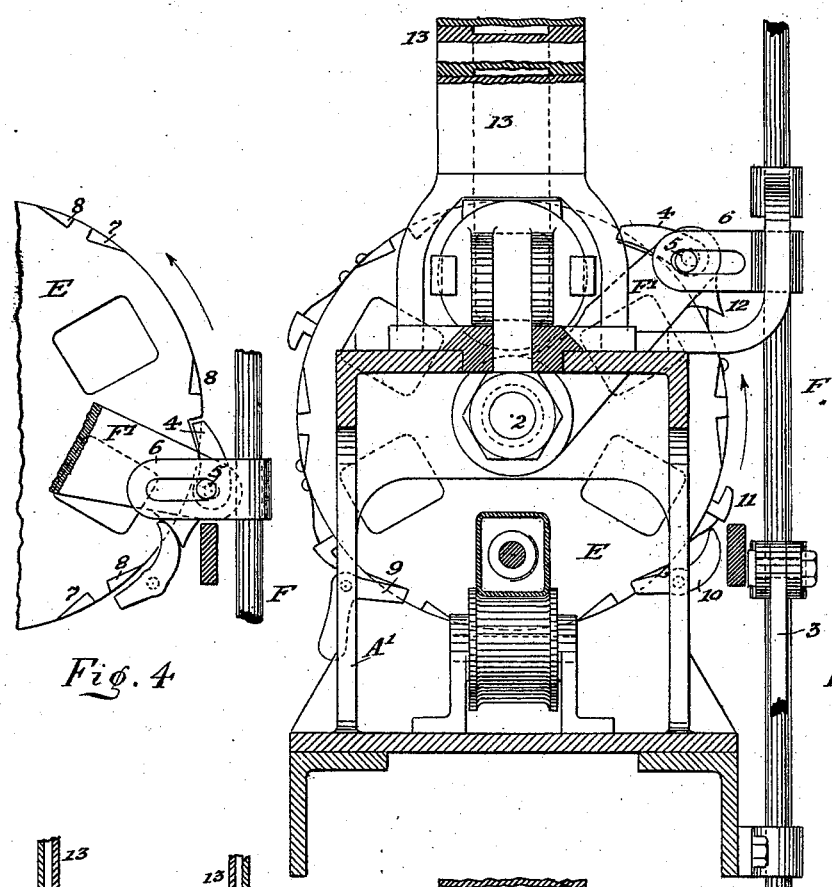
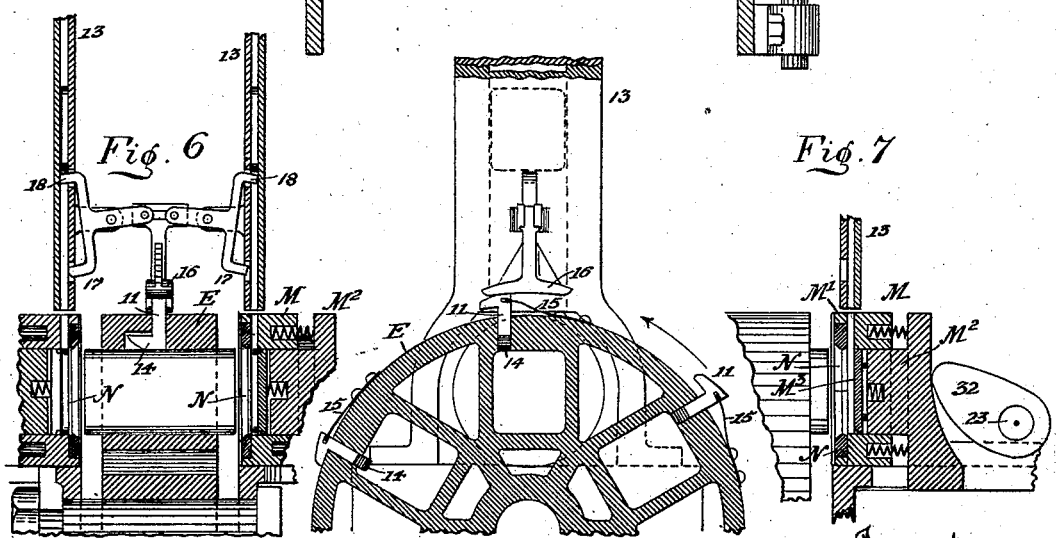
Witnesses:
J. C. Wasson.
Geo. F. Schild.
Inventor.
Robert D. Hume
by Spear & Seely
Attorneys (No Model.) 4 Sheets—Sheet 4.
R. D. HUME.
CAN HEADING AND SOLDERING MACHINE.
No. 576,122. Patented Feb. 2, 1897.
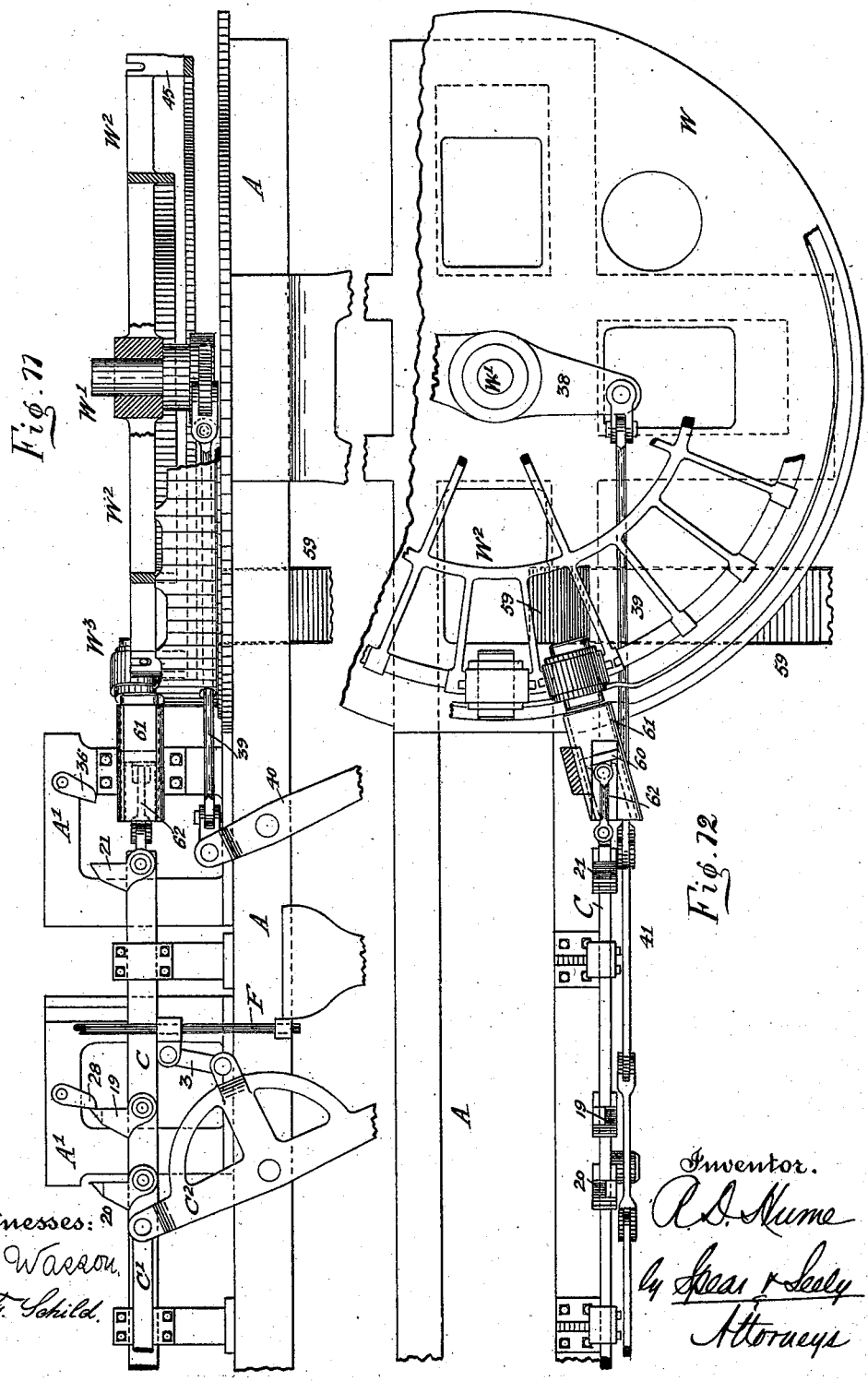

UNITED STATES PATENT OFFICE.

ROBERT DENISTON HUME, OF GOLD BEACH, OREGON.

CAN HEADING AND SOLDERING MACHINE.

SPECIFICATION forming part of Letters Patent No. 576,122, dated February 2, 1897.

Application filed February 21, 1895. Serial No. 539,249. (No model.)

*To all whom it may concern:*

Be it known that I, ROBERT DENISTON HUME, a citizen of the United States, residing at Gold Beach, in the county of Curry and State of Oregon, have invented certain new and useful Improvements in Can-Heading and Head-Soldering Machines; and I do hereby declare that the following is a full, clear, and exact description thereof.

My invention relates to can-making machinery, and more particularly to machinery for heading can-bodies and machinery for soldering the heads.

It also relates particularly to the heading and head-soldering of cans of angular cross-section as distinguished from cylindrical cans.

The object of my invention is to produce a machine which will place heads upon such can-bodies in rapid succession and will then solder such heads by a continuous operation carried on by a single connected mechanism.

The mechanisms shown and described herein may be and are designed to be used with can-body-forming mechanism; but such mechanism forms no part of the present invention, excepting one minor feature relating to the construction of the lifters which supply body-blanks to the forming-horn.

In the accompanying drawings, Figure 1 is a side elevation of the heading and soldering mechanism, including the can-head-feeding devices. Fig. 2 is a plan view of the same. Fig. 3 is a rear elevation of the heading mechanism. Fig. 4 is a detail view to illustrate the mode of driving the rotary carrier which receives the can bodies and heads from the horn, delivers them to the heading mechanism, and, after heading, places them in line with the soldering mechanism. Fig. 5 is a vertical cross-section of the carrier with one of the can-head-feeding chutes in elevation. Fig. 6 is a vertical longitudinal section of the heading and crimping mechanism and of a part of the carrier, showing a can-body and two can-heads in position ready for heading. Fig. 7 is a detail longitudinal section of one of the heading rams or plungers. Fig. 8 is a cross-section and side elevation showing one of the can-receivers of the soldering mechanism. Fig. 9 is a broken end elevation of the same. Fig. 10 is a broken cross-section of part of the soldering mechanism, illustrating the relative positions of one of the can-receivers and the soldering trough or tank. Fig. 11 is a side elevation of a special device for clearing the head-soldering mechanism of any cans remaining in it after the regular supply of cans has ceased for any reason. Fig. 12 is a plan view of the same. Fig. 13 is an elevation, and Fig. 14 is a longitudinal section, of part of the body-blank-feeding mechanism, showing a special device for rendering the successive feeding of such blanks accurate and certain.

Throughout the drawings, A represents the main supporting-frame of the machine, by which the whole operative mechanism is carried.

C is the side bar, reciprocated by a connection from a driving-shaft and extending nearly the entire length of the frame. Separate connections from this bar operate all the devices which act successively upon each can-body as it is propelled along the forming-horn.

D' is a forward extension of the stationary forming-horn, having a limited movement independently of the horn derived from the side bar, as fully shown in the application above referred to. The purpose of this extension is to receive the can-bodies from the horn and place them successively in position to be acted upon by the heading mechanism. The extension D' is directly driven by the rod G, which is also a pipe for supplying gas for heating the soldering devices.

The heading devices consist, first, of a rotary carrier which receives the can-bodies sucsively from the horn and places them in line with the heading-plungers; secondly, of automatically-operated can-head-feeding mechanism, and, thirdly, of oppositely-acting rams or plungers, which operate crimpers and which place the heads upon the can-bodies and secure them there.

E represents the rotary carrier, which is cast or otherwise formed with a series of chambers adapted to hold the can-bodies and corresponding to the latter in size and shape. The carrier is mounted upon a pin 2 in a superstructure A' of the main frame and has a rotary motion transversely of or across the frame. The head-feeding, heading, and crimping devices are mounted upon and above this part of the frame, Fig. 1, in line with the upper part of the carrier, while the can-bodies are received from the horn at the lower part of the carrier and by its rotation are carried up to a position in line with the heading-plungers and successively subjected to the operations of heading and crimping. The continued rotation of the carrier brings the headed cans successively in line with the horn again, so that each incoming can-body expels a headed can from the chamber in the carrier which it is to occupy itself and places it in the soldering mechanism. Thus the entrance of can-bodies and the discharge of headed cans take place in line with the main horn in the lower part of the carrier, while the heading and crimping are performed out of line with the horn and at the upper part of the carrier.

The means for driving the carrier E are best shown in Figs. 1, 3, and 4. C' is a connecting-rod supposed to be pivoted to the side bar and reciprocating with it. To this bar is connected the bell-crank $C^2$, pivoted to the main frame and extending below it, the extension being connected to the mechanism for soldering the heads, which will be hereinafter described. The bell-crank gives motion through a swinging link 3 to vertically-sliding rod F, which is the actuating-rod for the can-carrier E. From this rod the can-carrier derives a step-by-step rotation in the direction of the arrow, Fig. 3, the motion being communicated by a pawl 4, mounted on a pin 5 in a slotted bracket 6, secured to the slide-rod F. The pin 5 is also loose in the end of an arm F', pivoted upon the stationary axis of the rotary carrier. The vertical motion of the slide-rod therefore oscillates the arm F', and since the pawl is mounted in a slot in which it can move freely it is caused to follow the circular periphery of the carrier both in its forward motion and on its backward stroke. When the slide-rod descends, the arm F' forces the pawl outward in the slot, the length of which is properly proportioned to that of the arc of the circumference over which the pawl travels.

The periphery of the carrier is provided with notches 7 and 8, arranged in pairs opposing each other. The notches 7 are for the pawl 4 and also for the pawl 9, which is simply a holding-pawl for preventing any back motion. The notches 8 are for an automatically-acting pawl 10, which is designed to prevent any forward motion of the carrier while the can-body is receiving its head, for it is essential to the accurate and perfect heading of the cans that the carrier should be stationary during that operation. The pawl 10 is thrown in by one of the projections 11 on the carrier, Fig. 3, and is thrown out by a projection 12 near the end of the arm F on the downward stroke of the latter, Fig. 4.

Before describing the heading mechanism I refer to Figs. 5 and 6, which illustrate the can-head-feeding devices, which are automatically operated by the rotation of the carrier E. The can-heads are supplied through chutes 13 above the can-carrier and which communicate with slots or passages in the heading-rams adjacent to the can-carrier and at each side of the same.

Fig. 6 shows a can-body in the carrier, two heads in position to be forced upon it, and the next two heads above in the chutes ready to fall at the next movement of the can-carrier.

The can-head feed is operated by the projections 11, before referred to. These projections have angular beveled heads outside the carrier and are held within recesses in the carrier by their angular beveled feet 14, which are turned toward the incoming can-body. Springs 15 tend to press these projections inward at all times and do so when any chamber of the carrier is empty. One instance of this is shown in Fig. 5. When a can is in its chamber, however, the projection is pushed outward. In this position it strikes a shoe 16 above the carrier and forces it upward. The upper part of the shoe is slotted and is loosely jointed to the pivoted stops 17 17 18 18, which are alternately holding and releasing devices for the can-heads. These stops project through holes in the chute and are operated simultaneously by the movement of the shoe. Fig. 6 shows the operation clearly. Here the projection 11 has just been forced outward by the entering can and has raised the shoe. The heading-rams (not yet described, but shown in that figure) are about to force two heads upon the ends of the can-body. Since the upward movement of the shoe has withdrawn the stops 17 from the chutes, the two can-heads have fallen into position in line with the can-body. By the same motion the stops 18 have entered the chutes and have cut off the cans above, which will not be allowed to drop until the stops 17 enter the chute again in readiness to hold the next one. By this means the chutes above the stops can be kept filled with can-heads to its full extent without interfering at all with the regular and accurately-timed feed of single heads to the heading mechanism. The stops 17 control and regulate the feed of single heads to the header, while the alternately-acting stops 18 cut off the supply of heads above. The spring-projections 11 also constitute a safety device to prevent the feeding of can-heads when the carrier or any of its chambers are empty, since when a projection is in a position shown at the left of Fig. 5 it cannot raise the shoe to operate the can-head-releasing devices.

The heading-rams in their construction are like that shown in my application before referred to for placing and crimping the can-bottoms upon the body. In the present case, however, two of such rams are used for placing and securing both heads simultaneously, and I have therefore changed the method of operating the rams to meet the present conditions. In that case the single ram referred to was driven by the main shaft of the machine. In the present case both rams are operated by the side bar C.

The rams H H' are similar in construction and are respectively secured to slides J J', guided in the top superstructure A' and moving simultaneously and horizontally in opposite directions. Secured to the side bar are two projections 19 20 for operating the slide J and one projection 21 for operating the slide J'. Transverse shafts 22 and 23 rock in the slide in bearings 24. Referring, first, to the slide J, Fig. 2, 25 is a cam which is secured to the rock-shaft 22 in line with the ram J. A cam 26 on the end of the same shaft is in the path of the projection 19. The forward stroke of the side bar rocks the shaft 22 and causes the ram 25 to drive the ram inward toward the can-carrier heading the can at that end. Below the shaft 22, but in the frame of the machine, is another rock-shaft 27, having at its end a cam 28, and also having a cam 29, which projects up into a slot or recess 30 in the slide J. The cams 26 and 28 are thus close together, and both are in the path of the projection 19, but as the purpose of that projection is only to drive the ram, its bearing-surface is rabbeted so that it misses the cam 28 and strikes only the cam 26. The projection 20 on the side bar is oppositely rabbeted, so as to strike only the cam 28, and as this cam is on a shaft journaled in the stationary frame the cam 29 is caused to bear upon the slot 30 and thus retract the slide.

A single projection 21 on the side bar operates the ram H' and the slide J'. A rock-shaft 23 in the slide J' has two cams 32 and 33, the former bearing on the ram and the latter being in the path of the projection 21. A rock-shaft 34 is journaled in the frame and has two cams 35 36, one adapted to bear upon the end 37 of the slide and the other to be struck by the projection 21 and to withdraw the slide J' after the ram is forced inward. Fig. 1 gives a clear idea of the relative positions of all these parts. Thus at each forward stroke of the side bar both heads are secured and the rams withdrawn make place for new can-heads, while at the backward stroke of the side bar the can-carrier is moved forward a step and two can-heads fed into line ready for the heading operation. The first effect of the contact of the projection 21 against the cam 33 is to swing this cam and thus turn the shaft 23 in its bearings, thus forcing the cam 32 against the ram. This action has no tendency to force the slide J' back, as the shaft turns freely and the slide offers sufficient frictional resistance to prevent movement of the slide. The continued movement of the bar brings the projection 21 against the cam 36, thus turning the shaft 34 and bringing the cam 35 against the end 37 of the slide to move the same back.

As before stated, the heading-rams themselves are substantially similar in construction to the one shown in my application for patent referred to. Each comprises a ring M, having a covering-plate M' and an independent plunger $M^2$, the latter being provided with a spring-pad $M^3$, which bears upon the surface of the can-head. The crimping-sections N are also like those shown in said application and are operated in the same way, that is, by the independent movement of the plunger $M^2$ after the ram and plunger, moving as one, have placed the head upon the can-body.

I have now arrived at the point where the can is to be completed by soldering both heads and proceed to describe the automatic mechanism operated from the side bar of the machine for accomplishing the head-soldering.

The cans pushed out of the rotary carrier by the extension of the forming-horn pass into a tube $D^4$ in line with the bottom of the carrier, through which tube they are carried to the soldering mechanism. This mechanism is mounted upon the machine-frame and is operated by the reciprocating side bar.

W is a table which forms part of the main frame of the machine. On the table are secured stationary and concentric guide-tracks 135 136.

W' is a vertical shaft or pin fixed centrally in the table. Loosely mounted upon this pin is an annular ring or skeleton frame $W^2$, which rests upon a series of rollers journaled in lugs on the table, Fig. 10. The ring is intermittingly moved by a lever 38, mounted upon the pin W', from which lever a connecting-rod 39 extends to the lever 40, pivoted to the main frame. A rod 41 connects this lever to the downward extension of the bell-crank $C^2$, which drives the can-body carrier before described. The lever 38 has a pawl 42, which engages the notches $w$ in the ring $W^2$ successively, so that at each backward stroke of the side bar C the ring is moved forward the distance between two of the notches, but remains stationary during the forward stroke, which carries the pawl back to engage with another notch. The ring is prevented from moving forward except at proper times by a spring-holding pawl $w'$, which enters reversely-arranged notches $w^2$ of the ring. The driving-pawl in its back movement disengages the holding-pawl, Fig. 2. A second holding-pawl $w^3$ is provided in line with the can-entrance to insure perfect accuracy in alinement. The outer periphery of the ring rotates between the tracks 135 136, Fig. 10. Secured to the ring are standards or lugs 45, in which are slots forming half-bearings 46 for the trunnions of the can-receivers $W^3$, three of which are shown in Fig. 2 with cans in place.

The can-receiver consists of an outer shell 47, having trunnions 49, which rest in the bearings 46, yielding half-bearings 48 being also provided, as shown in Figs. 8, 9, and 10. Within the shell 47 is an open-ended tube or cylinder 50, the internal bore of which is shaped so as to receive the oblong or other angularly-shaped can. The cylinder 50 fits loosely enough to rotate loosely at proper times in the outer shell. These inner cylinders are the actual can-receivers, into which cans are pushed successively from the tube $D^4$ after being headed. The can-receivers and cans contained in them receive, by the rotation of the ring, an intermittent or step-by-step motion around the table. They derive also a tilting motion on their trunnions by means of which the ends are caused to dip separately into solder-baths, and in addition receive as many partial rotations or intermittent turns as there are sides to the can. In soldering round cans it is of course feasible and preferable to roll the edge around in the solder-bath by a continuous motion; but with square cans, in order to apply solder equally at all sides, a special motion is required involving this intermittent turning of the cans from one flat side to the next. In the present machine four such turns are given to completely solder a square can, as hereinafter described.

The tilting motion is produced by the bearing of the can-receivers upon the upper edge of the concentric tracks 135 136, which relatively to each other are either of the same height or of different height, according to the position which the can must assume at any particular stage of the operation of soldering. In soldering the outer head the inner track is raised above the outer to depress the can into the acid bath 52 and one solder-trough 53, and the outer track is raised above the inner to depress the inner end of the can to the inner acid bath and inner solder-trough at the opposite side of the table.

The intermittent turns given to the inner shell 50 of the can-receiver and to the can within it are also imparted by a peculiar construction of the tracks in connection with certain devices carried by the can-receivers. Figs. 1 and 9, taken together, clearly illustrate these features. The upper rims of the tracks upon which the cylinder 50 rests are provided with alternate elevations and depressions 54 55 and with a series of projecting pins 56, one at each elevation. The can-holding cylinders 50 have four projecting pins 57 at each end, each being adjacent to a corner of the can. As the ring carrying the cans rotates these pins successively strike the pins 56, the effect being to give the cylinder 50 a partial turn over the elevation 54 and into the next depression 55, as illustrated by the positions of the two can-holders in Fig. 9, and it must be noted that in soldering oblong cans of unequal length and width the depressions 54 55 will be alternately shallow and deep, as shown, because, since the acid or solder is always at the same level, it is necessary to drop the long edge of the can a little lower than the short edge in order that both shall enter the baths to the same depth. By this construction, instead of being rolled in the solder, the square edge of the can remains in the bath stationary while the ring is stationary and moving horizontally between the pins on the track. Thus all parts of the edge are thoroughly subjected to the solder, which enters the joint partly by gravity and partly by capillary action.

When any can-receiver of the series arrives opposite the tube $D^4$, its completely-soldered can is pushed out by an incoming unsoldered can and falls through an opening in the table into a chute 59. The can is now completely finished.

I have provided, and have shown in Figs. 11 and 12, a separate device for clearing the soldering mechanism from soldered cans when from any cause no cans are being supplied by the header. This device is an auxiliary plunger 60, working in an inclined guide-tube 61 in line with one of the can-receivers $W^2$ and driven by a connecting-rod 62 directly from the end of the side bar. The rod 62 is jointed to the plunger and to the side bar, so that the plunger can work obliquely, and the device is detachable from the machine. It is only necessary to start up the machine, so as to bring the soldered cans successively opposite the plunger, by which they will be pushed out of their holders and fall into the chute below the table.

I stated before that one part only of the present invention related to the forming of can-bodies, or, rather, to the feeding of the sheet-metal blanks from which the can-bodies are formed. Figs. 13 and 14 illustrate the improvement alluded to. A portion of the main frame is shown, a pile of blanks, and the pneumatic lifters which raise the blanks singly and successively to a position where they can be seized by reciprocating carriers. Two doors 63 are hinged at the end of the frame to confine the pile of blanks, and in each door is a tooth or toothed plate 64, which when the doors are closed are pressed by springs against the pile of blanks and tend to separate them, so that less resistance is offered to the suction-cups.

What I claim is—

1. In a can-making machine and in combination, a rotary carrier having receptacles for can-bodies, a plunger for placing can-bodies within and discharging cans from said receptacles, heading-rams on opposite sides of said carrier, and a connected mechanism for operating said plunger and said rams, and for rotating said carrier, substantially as described.

2. In a can-making machine, a rotating disk having chambers for holding can-bodies, a plunger adapted to enter said chambers successively, and heading mechanism arranged relatively to the disk, whereby each can-body placed in the disk is carried around by the rotation of the disk, is headed while in the disk, and is discharged by the said plunger, substantially as described.

3. In a machine for making cans, a can-body-forming horn, a movable extension thereof constituting a reciprocating plunger, reciprocating heading-rams, and a rotary disk having chambers adapted to be brought successively into line with said plunger, and successively into line with said heading-rams, substantially as described.

4. An organized machine for making cans, consisting of a can-body former, an extension of said former, constituting a reciprocating plunger, a rotary disk or carrier having can-holding chambers, heading-rams, can-head-soldering mechanism, a passage in line with said plunger leading to said soldering mechanism, and a reciprocating side bar having connections for operating said plunger, said disk, said carrier, said rams, and said soldering mechanism, substantially as described.

5. In combination with a rotating disk or carrier, having chambers for can-bodies, can-head-feeding chutes, stops for controlling the feed of can-heads therein, a shoe adjacent to said disk and connected to said stops, and movable projections in said disk extending into said can-body-holding chambers, substantially as and for the purposes set forth.

6. In a can-making machine, the combination with a reciprocating side bar, of a vertically-sliding rod connected thereto, and having a slotted bracket, a pawl in said bracket, a rotary circular can-carrier having notches in its periphery, and an oscillating arm swinging on the axis of said disk and connected to said pawl, substantially as described.

7. In combination with the reciprocating side bar C, two simultaneously-acting heading-rams, slides carrying said rams, and connections from said side bar for moving both rams simultaneously but in opposite directions by one and the same stroke of the side bar, substantially as described.

8. In combination with the frame A', the slides J J', the rams H H', the side bar C, having projections 19, 20, and 21, the cams 25, 26, and 32, 33, pivoted in the said slides, and the cams 28, 29, and 35, 36, pivoted in the said frame, substantially as described and shown.

9. In combination with the rotary can-carrier having peripheral projections, the feed-chutes 13, 13, for can-heads, the upper and lower can-head stops 18, 18, and 17, 17, pivoted so as to alternately project into and withdraw from upper and lower openings in the respective chutes, and the shoe 16, connected to all of said stops, so as to operate them simultaneously, substantially as described.

10. In combination with a rotary disk, having can-holding chambers, projections entering said chambers and pressed inwardly by springs, can-head-feeding chutes having stops for controlling said feed, and a shoe connected to said stops; whereby, when can-bodies are in said chambers, said projections will be forced outward so as to strike said shoe, but not when said chambers are empty.

11. In combination with an intermittingly-moving carrying-ring, a series of can-receivers, each composed of an outer cylinder having trunnions mounted in said carrying-ring, and an inner cylinder or can-holder having projections; and a guide-track having pins in the path of said projections; whereby a partial rotation is given said inner cylinder at each contact between said pins and said projections, substantially as described.

12. In a can-head-soldering mechanism for cans of oblong shape, the combination of a solder-trough, an intermittingly-moving carrying-ring, a series of can-receivers traveling with said ring upon guide-tracks, a series of depressions in said track deep and shallow relatively to one another in alternation, and means for turning said can-receivers from each depression to the next depression, substantially as described, and for the purposes set forth.

13. In a can-head-soldering mechanism, the combination with a series of traveling can-receivers, of a reciprocating bar for imparting motion to said series, and an auxiliary rod connected to said bar and having a plunger adapted to enter said can-receivers successively, substantially as and for the purpose set forth.

14. In combination with the traveling ring $W^2$, the radial can-receivers carried thereby, and the side bar C for giving motion to said ring; the oblique passage 61, and the plunger 60, connected to said side bar, substantially as described and for the purpose set forth.

15. In can-making machinery, the combination with adhesive cups for lifting body-blanks, singly, from a pile, of hinged doors for confining the pile of blanks, and teeth carried by said doors, substantially as and for the purposes set forth.

16. In can-making machinery, the combination with adhesive cups for lifting body-blanks singly from a pile, of hinged doors adapted to close against the pile, and serrated spring-plates attached to said doors, substantially as and for the purposes set forth.

In testimony whereof I have affixed my signature, in presence of two witnesses, this 24th day of December, 1894.

ROBERT DENISTON HUME.

Witnesses:
L. W. SEELY,
GEO. T. KNOX.